(12) United States Patent
Caretta et al.

(10) Patent No.: US 7,041,185 B2
(45) Date of Patent: May 9, 2006

(54) METHOD OF MAKING A TIRE

(75) Inventors: Renato Caretta, Gallarate (IT); Maurizio Marchini, Seregno (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 09/840,095

(22) Filed: Apr. 24, 2001

(65) Prior Publication Data

US 2002/0029841 A1    Mar. 14, 2002

Related U.S. Application Data

(63) Continuation of application No. 09/219,422, filed on Dec. 23, 1998, now abandoned.

(60) Provisional application No. 60/098,376, filed on Aug. 28, 1998.

(30) Foreign Application Priority Data

Dec. 30, 1997    (EP)    .................................. 97830731

(51) Int. Cl.
*B29D 30/16*    (2006.01)
*B29D 30/18*    (2006.01)

(52) U.S. Cl. ...................... 156/117; 156/131; 156/133; 156/135; 156/406.4

(58) Field of Classification Search ................ 156/117, 156/123, 133, 134, 397, 405.1, 406.4, 131, 156/135; 152/548, 560, 539, 540, 541
See application file for complete search history.

(56) References Cited

U.S. PATENT DOCUMENTS

| 0,948,064 | A |   | 2/1910 | Seiberling et al. |
| 1,350,995 | A |   | 8/1920 | Grabau |
| 1,728,957 | A |   | 9/1929 | Dickinson |
| 3,044,522 | A |   | 7/1962 | Drakeford et al. |
| 3,044,523 | A |   | 7/1962 | Drakeford et al. |
| 3,072,171 | A | * | 1/1963 | Drakeford et al. .......... 152/541 |
| 3,240,250 | A | * | 3/1966 | Frazier ....................... 152/560 |

(Continued)

FOREIGN PATENT DOCUMENTS

EP    0557615    9/1993

(Continued)

OTHER PUBLICATIONS

English-language Abstract of EP 0,664,231 submitted with that patent.

(Continued)

*Primary Examiner*—Geoffrey L. Knable
(74) *Attorney, Agent, or Firm*—Finnegan, Henderson, Farabow, Garrett & Dunner, L.L.P.

(57) ABSTRACT

A method of making a tire includes forming at least one first carcass ply of a structure, forming at least one circumferentially-inextensible annular structure, and applying the at least one circumferentially-inextensible annular structure to a region close to inner cicumferential edges of the at least one first carcass ply. Forming the at least one first carcass ply includes preparing first strip lengths, each first strip length including longitudinal and parallel thread elements at least partly coated with at least one layer of raw elastomer material, and depositing the first strip lengths onto a toroidal support to define two side portions and a crown portion. The crown portions are disposed consecutively in side-by-side relationship along a circumferential extension of the toroidal support. The side portions of each first strip length cover in part or are partly covered by a side portion of at least one circumferentially-consecutive first strip length.

54 Claims, 6 Drawing Sheets

U.S. PATENT DOCUMENTS

| | | | |
|---|---|---|---|
| 3,826,297 A * | 7/1974 | Alderfer | 152/560 |
| 4,144,006 A | 3/1979 | Iuchi | |
| 4,168,193 A | 9/1979 | Brunet et al. | |
| 4,248,287 A | 2/1981 | Christman | |
| 4,673,014 A * | 6/1987 | Markow | 152/156 |
| 5,114,512 A | 5/1992 | Holroyd et al. | |
| 5,171,394 A | 12/1992 | Laurent | |
| 5,362,343 A | 11/1994 | Debroche | |
| 5,453,140 A | 9/1995 | Laurent et al. | |
| 5,529,105 A * | 6/1996 | Hayashi et al. | 152/517 |
| 5,660,656 A | 8/1997 | Herbelleauu et al. | |
| 6,318,432 B1 | 11/2001 | Caretta et al. | |
| 6,328,084 B1 | 12/2001 | Caretta et al. | |
| 2001/0023737 A1 | 9/2001 | Caretta et al. | |
| 2002/0011297 A1 | 1/2002 | Caretta et al. | |
| 2002/0056498 A1 | 5/2002 | Caretta et al. | |

FOREIGN PATENT DOCUMENTS

| | | |
|---|---|---|
| EP | 0664231 | 7/1995 |
| EP | 0664232 | 7/1995 |
| EP | 0780221 | 6/1997 |
| FR | 0384231 | 4/1908 |
| FR | 1317045 | 4/1963 |

OTHER PUBLICATIONS

English-language Abstract of EP 0,664,232 submitted with that patent.

Derwent Abstract No. 85-240,322 for JP 60.157.840, Aug. 19, 1985.

Derwent Abstract No. 90-027,261 for JP 01.306.233, Dec. 11, 1989.

* cited by examiner

METHOD OF MAKING A TIRE

This application is a continuation of U.S. patent application Ser. No. 09/219,422, filed Dec. 23, 1998 now abandoned; additionally, Applicant claims the right of priority under 35 U.S.C. § 119(a)–(d) based on patent application No. 97830731.2, filed Dec. 30, 1997, in the European Patent Office; further, Applicant claims the benefit under 35 U.S.C. Ø 119(e) based on prior-filed, copending provisional application No. 60/098,376, filed Aug. 28, 1998, in the U.S. Patent and Trademark Office; the contents of both of which are relied upon and incorporated herein by reference.

FIELD AND BACKGROUND OF THE INVENTION

The present invention relates to a method of making tires for vehicle wheels, comprising the steps of: manufacturing a carcass structure; optionally associating a belt structure with the carcass structure at a circumferentially external position thereof; associating a tread band with the belt structure at a circumferentially external position thereof; associating at least one pair of sidewalls with the carcass structure at laterally opposite positions; vulcanizing the obtained tire.

Manufacture of tires for vehicle wheels involves formation of a carcass structure essentially consisting of one or more carcass plies substantially having a toroidal conformation and the axially opposite side edges of which engage respective circumferentially inextensible annular reinforcing elements called "bead cores".

Applied to the carcass structure, at a circumferentially external position thereof, is a belt structure comprising one ore more belt strips in the form of a closed ring, essentially consisting of textile or metal cords suitably oriented relative to each other and to the cords belonging to the adjacent carcass plies.

A tread band currently consisting of a strip of elastomer material of appropriate thickness is applied to the belt structure, at a circumferentially external position thereof.

It is to point out that, to the aims of the present invention, by the term "elastomer material" it is intended a rubber blend in its entirety, that is the assembly made up of a base polymer suitably amalgamated with mineral fillers and/or additives of any other type.

Finally, to the opposite sides of the tire being manufactured a pair of sidewalls are applied, each of them covering a side portion of the tire included between a so-called shoulder region, located close to the corresponding side edge of the tread band, and a so-called bead located at the corresponding bead core.

In accordance with traditional production methods, essentially the above listed tire components are first made separately from each other to be then assembled during a tire-manufacturing step.

For instance, for making the carcass ply or plies to be associated with the bead cores to form the carcass structure, production of a rubberized fabric comprising longitudinally-disposed continuous textile or metallic cords, through an extrusion and/or calendering process, is first required. This rubberized fabric is submitted to a transverse-cutting operation to produce lengths of predetermined sizes that are subsequently joined together so as to give rise to a continuous ribbon-like semifinished product having transversely-disposed parallel cords.

Then this article of manufacture is to be cut into pieces the length of which is correlated with the circumferential extension of the carcass to be made.

Production methods have been recently proposed which, instead of resorting to the production of semifinished products, make the carcass structure directly during the tire-manufacturing step.

For example, U.S. Pat. No. 5,453,140 herein quoted as an example of the most pertinent state of the art, discloses a method and an apparatus forming a carcass ply starting from a single cord previously wound around a reel.

According to the method and apparatus described in the above patent, at each operating cycle of the apparatus the cord drawn from the reel by power-driven idler rollers and maintained taut by a pneumatic tensioning system is cut to size to obtain a length of preestablished extension.

The cord length is picked up by a pick-up element mounted on a belt wound over power-driven pulleys to be extended transversely on the outer surface of a toroidal support.

The length ends are then engaged by bending members of the belt type operating on the opposite sides of the toroidal support for radially applying the cord length to the toroidal support by means of slide elements acting like fingers along the side portions of the cord length.

Repetition of the above described operating cycle leads to deposition of a number of cord lengths disposed circumferentially in side by side relationship until the whole circumferential extension of the toroidal support has been covered.

Necessarily, the toroidal support is previously coated with a layer of raw rubber having a dual function, i.e. that of adhering to the cords deposited thereon so as to conveniently hold them in a fixed positioning, and that of constituting an inner liner impervious to air in the finished tire.

Tires obtained by this production method have a carcass structure in which the carcass ply or plies consist of individual cords each having two side portions axially spaced apart from each other and oriented radially of the rotation axis of the tire, and a crown portion extending at a radially outer position between the side portions.

Within the scope of the carcass structure manufacture, it is also known that close to each of the tire beads, the opposite ends of the individual cords forming a carcass ply are located, in an alternating sequence, at axially opposite positions relative to an annular anchoring element forming said bead core, as can be learnt from patent EP 0 664 231.

In accordance with the present invention, within the tire-manufacturing scope remarkable advantages have been found to be achieved if the carcass ply or plies are made by depositing strip-like lengths instead of individual cords, each of said lengths essentially comprising a layer of raw elastomer material incorporating two or more parallel thread-like elements disposed longitudinally.

SUMMARY OF THE INVENTION

In more detail, the invention relates to a method of making a tire for vehicle wheels, wherein manufacturing of the carcass structure involves formation of at least one first carcass ply by the following steps: preparing strip-like lengths each comprising longitudinal and parallel thread-like elements at least partly coated with at least one layer of raw elastomer material; depositing each of the strip-like lengths onto a toroidal support in a substantially U-shaped conformation about the profile in transverse section of the toroidal support, to define two side portions substantially extending in planes orthogonal to a geometric axis of rotation of the toroidal support at mutually spaced apart positions in an axial direction, and a crown portion extending at a radially outer position between the side portions, wherein the crown portions of each strip-like length are disposed consecutively in side by side relationship along the circumferential extension of the toroidal support, whereas the side portions of each strip-like length are each partly covered with a side portion of at least one circumferentially consecutive length.

Preferably, preparation of said strip-like lengths is carried out by cutting actions executed sequentially on at least one continuous strip-like element incorporating said thread-like elements in said layer of raw elastomer material.

In addition, each cutting action is preferably provided to be followed by deposition of the individual length thus obtained onto the toroidal support.

In more detail, the side portions belonging to circumferentially contiguous lengths on the toroidal support are caused to mutually converge at the geometric axis of rotation of the toroidal support itself.

Advantageously, covering of the side portions of the strip-like lengths progressively decreases starting from a maximum value at radially inner ends of the side portions until a zero value at transition regions between said side portions and crown portions.

In a preferential solution the individual strip-like lengths are sequentially deposited onto the toroidal support according to a circumferential distribution pitch corresponding to the width of the strip-like element.

In accordance with a possible alternative embodiment, the individual strip-like lengths are sequentially deposited onto the toroidal support according to a circumferential distribution pitch corresponding to a multiple of the width of the strip-like element.

Preferably, each strip-like length has a width corresponding to a submultiple of the circumferential extension of the toroidal support, as measured at an equatorial plane thereof.

According to a further aspect of the invention, accomplishment of said at least one first carcass ply further involves a step of sequentially pressing the strip-like element at its side portions, to define regions of increased width close to the inner circumferential edges of the carcass structure.

Said pressing step can be optionally carried out on the continuous strip-like element before executing the cutting action.

Concurrently with said pressing step, moving apart from each other of the thread-like elements comprised in the strip-like element is carried out.

During the deposition step, at least one of the strip-like lengths may be advantageously held on the toroidal support by a suction action produced through the toroidal support.

In particular, formation of each strip-like length involves the steps of: laying down the strip-like length transversely and at a centered position relative to an equatorial plane of the toroidal support; radially moving the strip-like length close to the toroidal support so as to form the crown portion of the length on the toroidal support; translating the opposite ends of the strip-like length substantially radially close to the geometric axis of rotation of the toroidal support for applying the side portions of the strip-like length to the toroidal support; rotating the toroidal support relative to the distributor element through an angular pitch corresponding to the circumferential distribution pitch of the strip-like lengths.

A step of pressing said side portions of the strip-like lengths against the side walls of the toroidal support may be also provided.

Advantageously, accomplishment of the carcass structure further comprises the step of applying at least one inextensible annular structure to a region close to each of the inner circumferential edges of the carcass ply obtained from the deposition step.

According to a possible embodiment, accomplishment of the carcass structure further comprises the step of forming a second carcass ply superposed on the first carcass ply and the circumferentially inextensible annular structures.

Formation of the second carcass ply may advantageously take place in the same manner as accomplishment of the first carcass ply.

Formation of the carcass ply or plies may be preceded by a step of coating the toroidal support with at least one sealing layer made of an elastomer material impervious to air.

This coating step is advantageously carried out by winding at least one ribbon-like band of an air-proof elastomer material in coils disposed side by side along the profile in transverse section of the toroidal support.

In addition to, or in place of formation of the sealing layer, the following steps may be provided to be carried out before the vulcanization step: disengaging the tire from the toroidal support; introducing an air tube into the carcass structure.

During said vulcanization step, a step of stretching said carcass plies and belt strips may be advantageously carried out for achieving an expansion of the tire of a linear amount included between 2% and 5%.

In accordance with a further innovatory aspect of the invention, to be advantageously adopted also independently of the innovatory features set out hereabove, accomplishment of each inextensible annular structure comprises the steps of: depositing at least one first elongated element in concentric coils into a molding cavity in view of forming a first circumferentially inextensible annular insert substantially in the form of an annulus; depositing at least one second elongated element in concentric coils into the molding cavity in view of forming a second circumferentially inextensible annular insert substantially in the form of an annulus disposed coaxially in side by side relationship relative to the first annular insert; forming at least one filling body of raw elastomer material in the molding cavity, which filling body is interposed between, and intimately joined to the first and second circumferentially inextensible annular anchoring elements.

Each of the inextensible annular structures made as above described may be conveniently provided to be interposed between the first carcass ply and the second carcass ply.

Each of said deposition steps of the first and/or second elongated element can be conveniently preceded by a rubberizing step in which said first and/or second elongated element is coated with at least one layer of raw elastomer material.

Preferably, also provided is a step of magnetically retaining the first and/or second circumferentially inextensible annular insert, at a predetermined position, within the molding cavity.

Formation of said filling body may advantageously comprise the steps of: interposing at least one annular element of raw elastomer material of a predetermined volume between the first and second inextensible annular inserts; reducing the volume of the molding chamber in order to compress said annular element of elastomer material between the first and second inextensible annular inserts and deform it until it fills said molding chamber.

BRIEF DESCRIPTION OF THE DRAWINGS

Further features and advantages will be best understood from the detailed description of a preferred but non-exclusive embodiment of a method of manufacturing a tire for vehicle wheels according to the present invention. This description will be taken hereinafter with reference to the accompanying drawings, given by way of non-limiting example, in which.

DESCRIPTION OF THE PREFERRED EMBODIMENT

With reference to the drawings, a tire for vehicle wheels made by a method according to the present invention has been generally identified by reference numeral 1.

Figure 1:
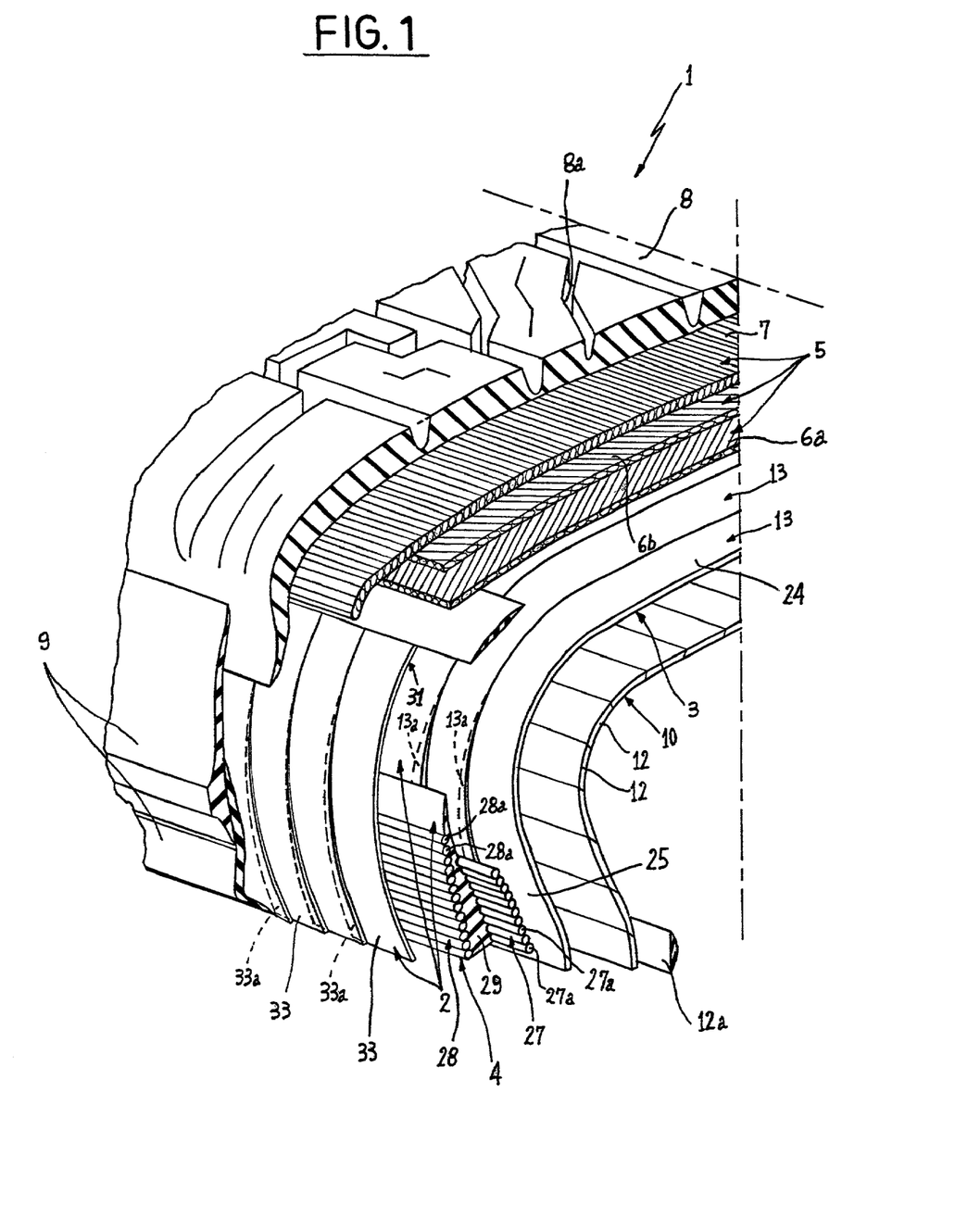
FIG. 1 is a fragmentary perspective view in split of a tire in accordance with the present invention.

Tire 1 essentially comprises a carcass structure 2 having at least one first carcass ply 3 having a substantially toroidal conformation and in engagement, by its opposite circumferential edges, with a pair of inextensible annular structures 4, each of which is located, when the tire has been completed, at the region usually identified as "tire bead".

Applied to the carcass structure 2 at a circumferentially outer position thereof, is a belt structure 5 comprising one or more belt strips 6a, 6b and 7. A tread band 8 is circumferentially superposed on the belt structure 5 and longitudinal and transverse cuts 8a are formed in said tread band 8, following a molding operation carried out concurrently with the tire vulcanization, and such disposed as to define a desired "tread pattern".

The tire also comprises a pair of so-called "sidewalls" 9 applied laterally to opposite sides of the carcass structure 2.

The carcass structure 2 may possibly be coated, on its inner walls, with a sealing layer 10, i.e. a so-called "liner", essentially consisting of a layer of elastomer material impervious to air, adapted to ensure the hermetic seal of the inflated tire.

Assembling of the above listed components, as well as production of one or more of said components, takes place with the aid of a toroidal support 11, diagrammatically shown in FIGS. 2 to 5, having the same configuration as the inner walls of the tire to be manufactured.

In a preferential solution the toroidal support 11 has reduced sizes relative to those of the finished tire, according to a linear amount preferably included between 2% and 5%, measured, just as an indication, along the circumferential extension of the support itself at an equatorial plane X—X thereof which is coincident with the equatorial plane of the tire.

The toroidal support 11, which is not described or illustrated in detail in that it is not particularly of importance to the purposes of the invention, may for example consist of a collapsible drum or an inflatable chamber or bladder suitably reinforced, so that it may take and maintain the desired toroidal conformation under inflation conditions.

After taking into account the above statements, manufacture of tire 1 first involves formation of the carcass structure 2 starting with optional formation of the sealing layer or liner 10.

This liner 10 can be advantageously made by circumferentially winding about the toroidal support 11, at least one ribbon-like band 12 of an air-proof elastomer material, produced from an extruder and/or a calender located close to the toroidal support itself. As viewed from FIG. 1, winding of the ribbon-like band 12 substantially takes place in circumferential coils disposed consecutively in side by side relationship to follow the profile in transverse section of the outer surface of the toroidal support 11.

For descriptive purposes, by "profile in transverse section" it is herein intended a configuration exhibited by the half-section of the toroidal support 11 sectioned along a plane radial to a geometric rotation axis thereof, not shown in the drawings, which is coincident with the geometric axis of rotation of the tire being manufactured.

Concurrently with winding of the ribbon-like band 12, application of a pair of auxiliary annular elements 12a can be carried out close to the inner circumferential edges of the carcass structure during its manufacturing step. Each of these auxiliary annular elements 12a can be obtained for example by winding the ribbon-like band 12 in a coil disposed axially side by side with the corresponding coil located at the inner perimetric edge of liner 10 defined or to be defined on the toroidal support 11. Alternatively, the auxiliary annular elements 12a can be made up of at least one auxiliary ribbon-like band obtained from a respective extruder located at the toroidal support 11.

In accordance with the present invention, the carcass ply 3 is directly formed on the toroidal support 11 by depositing thereon, as better clarified in the following, a plurality of strip-like lengths 13 obtained from at least one continuous strip-like element 2a preferably having a width included between 3 mm and 20 mm.

Figures 6, 7:
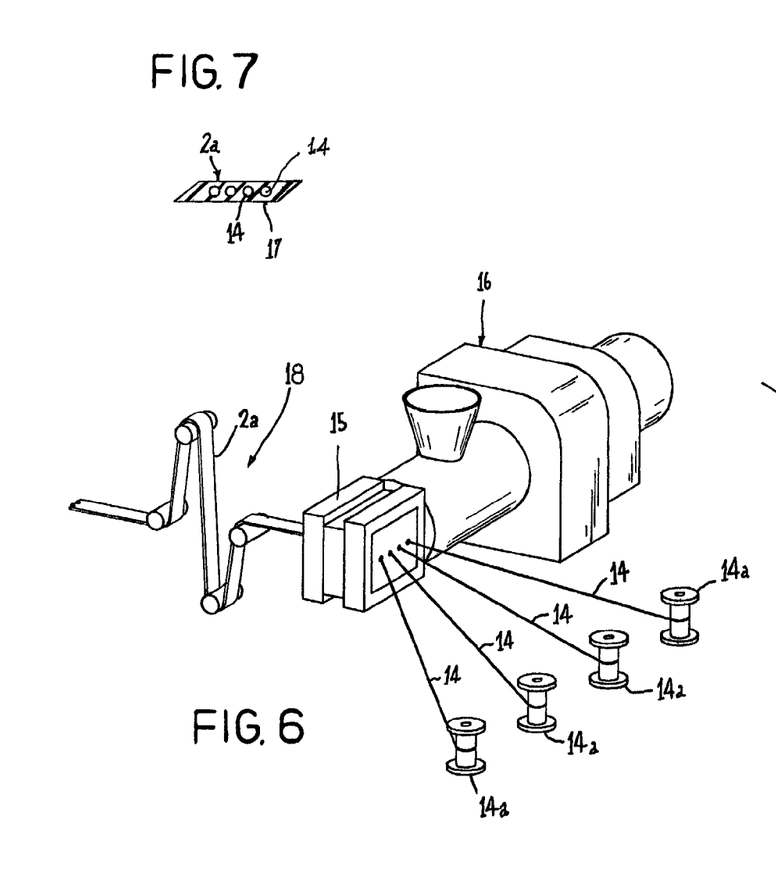
FIG. 6 is a diagram showing manufacture of a continuous strip-like element intended for forming the carcass ply or plies.
FIG. 7 shows an embodiment of said strip-like element in transverse section.

As shown in FIG. 6, preparation of the continuous strip-like element 2 essentially involves that two or more thread-like elements 14, and preferably three to ten thread-like elements 14, fed from respective reels 14a, should be guided through a first extruder 15 associated with a first extrusion apparatus 16 carrying out feeding of raw elastomer material through the extruder itself.

It is pointed out that, in the present description by "extruder" it is intended that part of the extrusion apparatus, also identified in this particular field by the term "extrusion head", provided with a so-called "die" passed through by the product being worked at an outlet port shaped and sized according to the geometrical and dimensional features to be given to the product itself.

The elastomer material and thread-like elements 14 are intimately joined together within the extruder 15, thereby generating the continuous strip-like element 2a at the outlet thereof, which element is formed of at least one layer of elastomer material 17 in the thickness of which the thread-like elements themselves are incorporated.

Depending on requirements, it is possible to guide the thread-like elements 14 in the extruder 15 in such a manner that they are not integrally incorporated into the layer of elastomer material 17 but appear on one or both surfaces thereof.

The thread-like elements 14 may each consist for example of a textile cord preferably having a diameter included between 0.6 mm and 1.2 mm, or a metallic cord preferably having a diameter included between 0.3 mm and 2.1 mm.

Advantageously, if required, the thread-like elements 14 can be disposed in the continuous strip-like element 2a in such a manner that they give the carcass ply 3 thus obtained unexpected qualities of compactness and homogeneity. For the purpose, the thread-like elements 14 can be for example disposed according to a density greater than six thread-like elements/centimeter, measured circumferentially on the carcass ply 3 close to the equatorial plane X—X of tire 1. In any case it is preferably provided that the thread-like elements 14 should be disposed in the strip-like element 2a according to a mutual distance between centers not lower than 1.5 times the diameter of the thread-like elements themselves, in order to enable an appropriate rubberizing operation between the adjacent threads.

The continuous strip-like element 2a coming out of extruder 15 can be advantageously guided, optionally through a first accumulator-compensator device 18, on a deposition apparatus 19 diagrammatically shown in FIGS. 2 to 5.

The deposition apparatus 19 essentially comprises first guide members 20, consisting for example of a pair of opposite rollers intended for engagement of the continuous strip-like element 2a produced by the extruder 15, downstream of the accumulator-compensator device 18.

Downstream of the first guide members 20, the strip-like element 2a comes into engagement with a first grip member 21 movable in a direction oriented transversely to the equatorial plane X—X of the toroidal support 11.

Figures 2, 3:
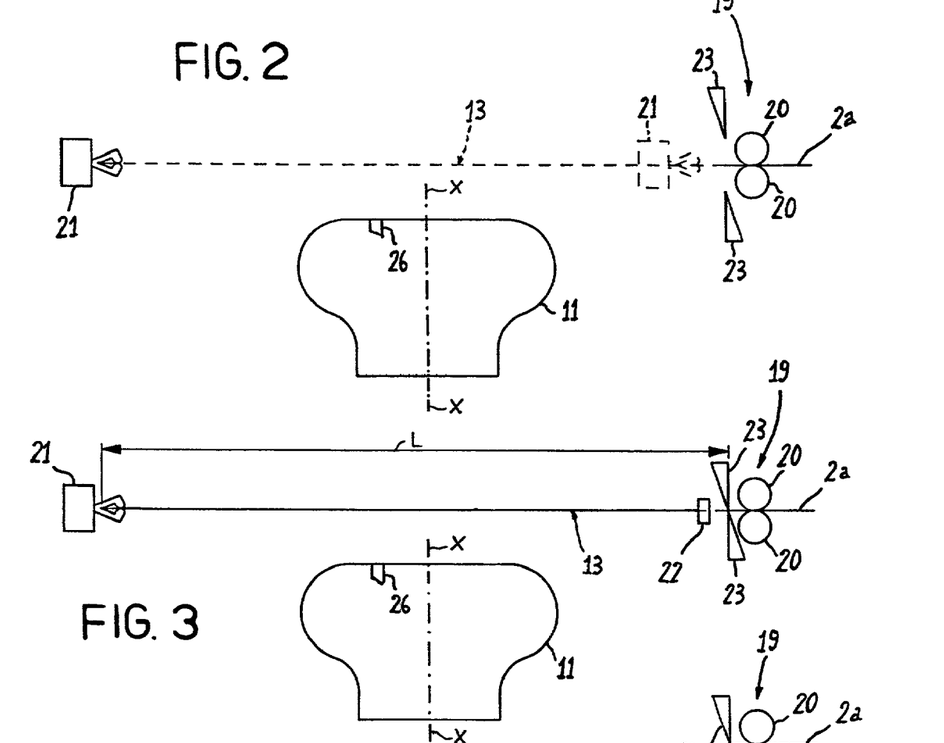
FIGS. 2 to 5 diagrammatically show an apparatus for making the carcass ply, according to different operating steps respectively, seen in a direction orthogonal to a diametrical section plane of a toroidal support carrying the tire during the manufacturing step.

In more detail, the first grip member 21 is movable between a first operating position in which, as shown in FIG. 2, it engages one end of the continuous strip-like element 2a close to the first guide members consisting of opposite rollers 20, and a second operating position in which, as shown in FIG. 3, it is moved apart from the first guide member in order to lay down the continuous strip-like element 2a transversely of the equatorial plane X-X of the toroidal support 11.

When the first grip member 21 has reached the second operating position, a second grip member 22 engages the continuous strip-like element 2a close to the first guide members 20.

Then, a cutting member 23 is operated and it cuts the continuous strip-like element 2a at a stretch thereof included between the second grip element 22 and the first guide members 20, giving rise to formation of a strip-like length 13 of a predetermined extension "L".

Following the cutting action by the cutting member 23, the obtained strip-like element 13 is laid down transversely and at a centered position relative to the equatorial plane of the toroidal support.

Afterwards, the grip members 21 and 22 are simultaneously translated in the direction of the geometric axis of the toroidal support 11 by radially moving the strip-like length 13 close to the toroidal support. Under this circumstance, formation of a crown portion 24 takes place at a centered position on the longitudinal extension of the strip-like length 13, which portion extends at a radially outer position on the toroidal support 11.

Figure 4:
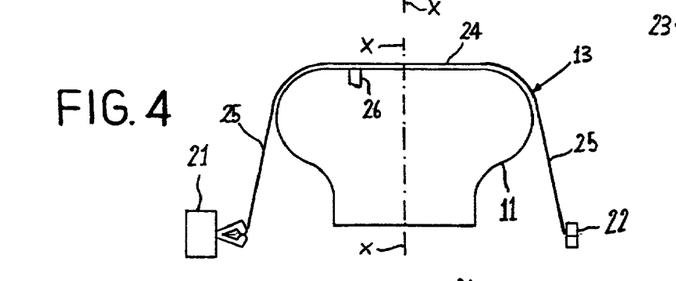
Figure 5:
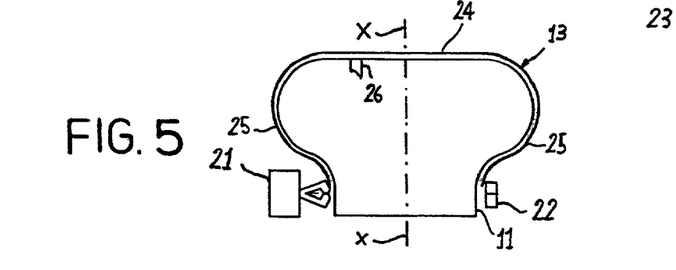

As clearly viewed from FIG. 4, as the radial movement of the grip members 21 and 22 goes on the opposite ends of the strip-like length 13 are moved radially close to the geometric axis of rotation of the toroidal support 11, giving rise to formation of two side portions 25 substantially extending in planes orthogonal to the geometric axis of rotation of the toroidal support, at positions axially spaced apart from each other.

By a possible subsequent movement of the grip members 21 and 22 close to the toroidal support 11, the opposite ends of the strip-like element are definitively applied to the toroidal support 11 so that deposition of length 13 is completed, this length taking a substantially U-shaped configuration about the profile in transverse section of the toroidal support.

Components intended for support and guided movement of the grip members 21 and 22 are not shown in the accompanying drawings as they can be made in any manner convenient for a person skilled in the art, and in any case they are not of importance to the aims of the present invention.

If required, the side portions 25 of the strip-like length can be submitted to a pressing step against the side walls of the toroidal support 11. For the purpose, a pair of pressing rollers or equivalent means not shown may be provided for operation on the opposite sides of the toroidal support 11, which rollers are each arranged to act on the respective side portion 25 by a thrust action and simultaneous radial sliding towards the geometric axis of rotation of the toroidal support 11.

Due to the sticky character of the raw elastomer material forming layer 17 coating the thread-like elements 14, a steady adhesion of the strip-like length 13 to the surfaces of the toroidal support 11 is ensured, even in the absence of liner 10 on said toroidal support. In more detail, the above described adhesion takes place as soon as the strip-like length 13 comes into contact with the toroidal support 11 at a radially external region of its profile in transverse section.

In addition to, or in place of the above described exploitation of the natural sticky character of the elastomer material, holding of one or more strip-like lengths 13 on the toroidal support 11 can be obtained by carrying out a suction action produced through one or more appropriate holes 26 arranged on the toroidal support.

The toroidal support 11 can be driven in angular rotation according to a step-by-step movement in synchronism with operation of the deposition apparatus 19, in such a manner that at each cutting action of each strip-like length 13 deposition of the latter onto the toroidal support takes place in a circumferential side by side relationship with the strip-like length 13 previously deposited.

In the embodiment diagrammatically shown in the accompanying figures, where the circumferential distribution pitch of the individual strip-like lengths 13 corresponds to the width of same, the angular-rotation pitch of the toroidal support 11 will correspond to the width of said lengths.

However, the circumferential distribution pitch of the strip-like lengths 13 may be provided to correspond to a multiple of their width. In this case, the angular-movement pitch of the toroidal support 11 will correspond to said circumferential distribution pitch. It is to point out that, to the aims of the present invention, when it is not otherwise stated, the term "circumferential" refers to a circumference lying in the equatorial plane X—X and close to the outer surface of the toroidal support 11.

Due to the above described operating sequence of the deposition apparatus 19, in the first carcass ply 3 obtained the crown portions 24 of each strip-like length 13 are disposed consecutively in side by side relationship along the circumferential extension of the toroidal support 11, whereas each of the side portions 25 of each length 13 is partly superposed with the side portion 25 of at least one length 13 previously laid down, and also partly covered with the side portion 25 of at least one length 13 laid down subsequently. In the accompanying figures, the overlapping regions of the strip-like lengths 13 forming the first carcass ply 3 are identified by 13a.

Figure 8:
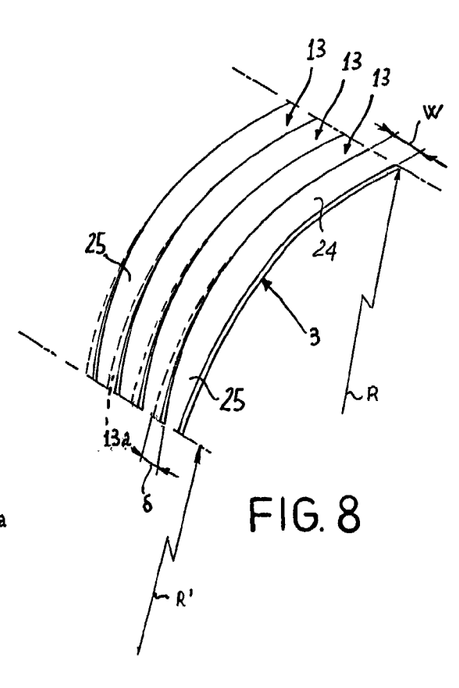
FIG. 8 is a fragmentary perspective view diagrammatically showing the deposition sequence of strip-like lengths for the purpose of forming a first carcass ply of the tire in accordance with the invention.

As clearly shown in FIG. 8, the side portions 25 in mutual superposition relationship move towards each other substantially in the direction of the geometric axis of rotation of the toroidal support 11, at an angle δ the value of which is correlated with the width "W" of the strip-like elements 13, and in any case with the circumferential distribution pitch thereof, as well as with the value of a maximum radius R to be measured at a point of maximum distance from the geometric axis of rotation of the toroidal support 11.

Due to the mutual convergence between the contiguous side portions 25, mutual superposition or covering of same, i.e. the circumferential width of the overlapping regions 13a, progressively decreases starting from a maximum value at the radially inner ends of the side portions, until a zero value at the transition region between the side portions 25 and crown portions 24.

It is to note that, due to the difference between the maximum radius R and a minimum radius R', to be measured at a point of minimum distance from the geometric axis of rotation of the toroidal support 11, the average density of the thread-like elements 14, i.e. the amount of the thread-like elements 14 present in a circumferential section of given length, progressively increases on moving close to said geometric rotation axis.

Actually, this increase in density is proportional to the ratio value between the maximum radius R and minimum radius R'.

It is also to note that the thread-like elements 14 belonging to two mutually superposed side portions 25 are disposed in respectively crossed orientations at an angle corresponding to said angle δ, in correlation not only with the value of the maximum radius R, but also with the width of the individual lengths 13 and the circumferential distribution pitch thereof.

If, depending on requirements, one wishes to modify the crossing angle of the thread-like elements 14, a pressing step may be provided to be executed on the continuous strip-like element 2a in the regions of its longitudinal extension corresponding to the ends of the strip-like elements 13 to be obtained from said cutting actions. In this manner regions of greater width located at the inner circumferential edges of the formed carcass ply 3 are defined on the extension of each strip-like length 13.

Said pressing action can be carried out by said guide rollers 20 or an auxiliary pressing roller (not shown) adapted to press the continuous strip-like element 2a in order to cause pressing of same at the longitudinal-extension sections intended to form the side portions 25 of the individual lengths 13. The pressing action causes a reduction in the thickness of the elastomer layer 17 and an increase in the width of the strip-like element 2a which, as a result, will make the thread-like elements 14 move apart from each other.

By suitably inclining the orientation of the geometric axis of rotation of the toroidal support 11 relative to the movement direction of the first grip member 21, the crown portions 24 of lengths 23 can be given a desired inclination, included, by way of example, between 0° and 25° relative to a radial plane passing by the geometrical axis. In more detail, this inclination may be advantageously included between 0° and 3° if tire 1 is provided with only one carcass ply 3, or between 10° and 20°, and more preferably it may correspond to 15° if, as provided in the embodiment herein illustrated, the carcass structure is comprised of two carcass plies 3, 31.

Accomplishment of a carcass structure 2 generally comprises the step of applying said inextensible annular structure 4 to an area close to each of the inner circumferential edges of the carcass ply 3 obtained in the previously described manner, for the purpose of creating the carcass regions known as "beads", which are specifically intended for ensuring anchoring of the tire to a corresponding mounting rim; in accordance with a preferred embodiment of the tire, the carcass ply thereof is obtained in the above described manner.

Each of these inextensible annular structures 4 (FIG. 10) comprises a first circumferentially inextensible annular insert 27, substantially in the form of an annulus concentric with the geometric axis of rotation of the toroidal support 11 and situated adjacent to a corresponding inner circumferential edge of the first carcass ply 3.

Figure 10:
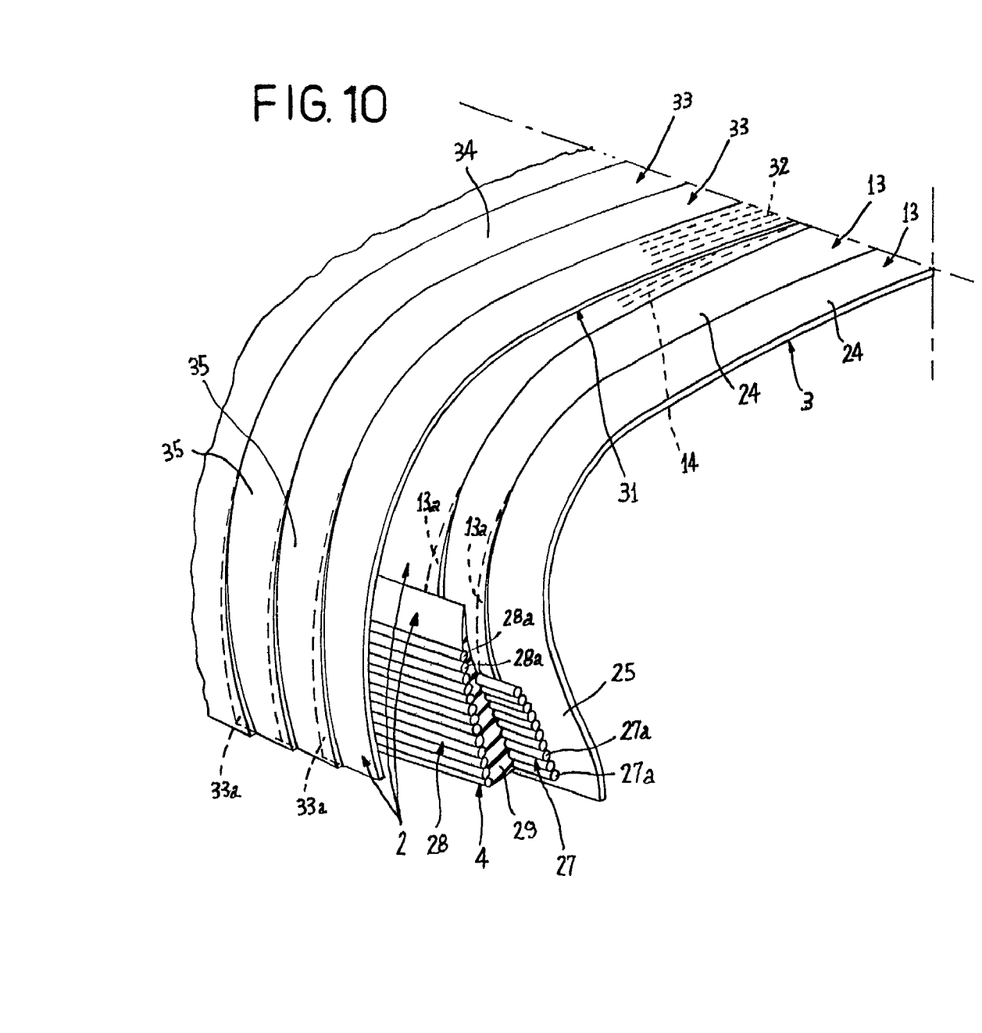
FIG. 10 is a fragmentary perspective view of an inextensible annular structure laterally applied between a first and a second carcass plies.

The first annular insert 27 is made of at least one elongated metal element wound up to form several substantially concentric coils 27a. Coils 27a can be defined by a continuous spiral or by concentric rings formed of respective elongated elements.

Combined with the first annular insert 27 is a second circumferentially inextensible annular insert 28 substantially extending in the form of a respective annulus disposed coaxially in side by side relationship with the first annular insert 27.

The second annular insert 28 too is preferably made of at least one elongated metal element wound up to form several substantially concentric coils 28a that can be defined by a continuous spiral or by concentric rings formed of respective elongated elements.

Preferably, the second annular insert 28 has a radial extension given by the difference between the minimum inner radius and the maximum outer radius of the annular insert, which is greater than the radial extension of the first annular insert 27.

Interposed between the first and second annular inserts 27, 28 is at least one filling body 29 of elastomer material preferably having a hardness included between 70° and 92° A Shore.

As better clarified in the following, during the tire use the above described annular structures 4 efficiently counteract tendency of the beads to rotate about their resting points on the rim under the effect of slip thrusts directed parallelly to the rotation axis of tire 1. This tendency to rotation is particularly apparent when the tire is employed under conditions of partial or complete deflation.

Figure 9:
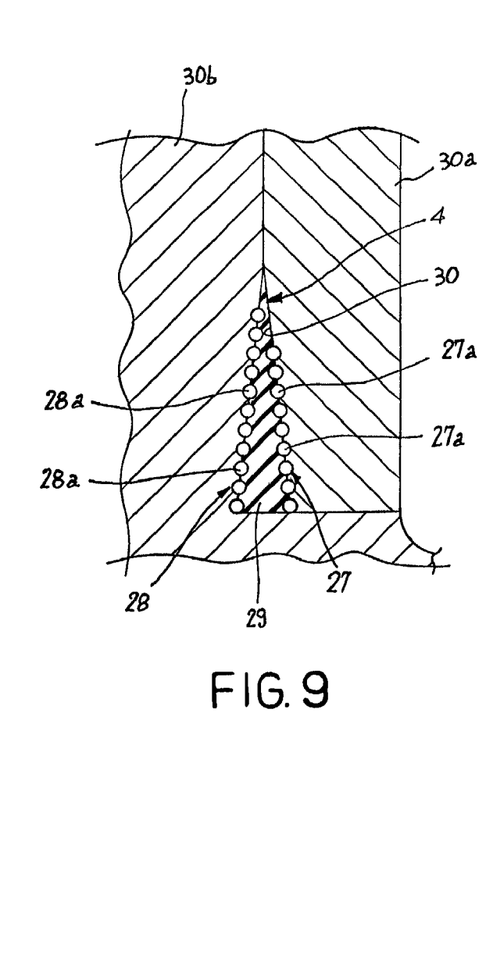
FIG. 9 is a fragmentary diametrical section view of an inextensible annular structure to be inserted at the tire bead, during a molding step for manufacturing the tire.

Preferably, accomplishment of each annular structure 4 involves formation of a first inextensible annular insert 27 within a molding cavity 30 defined in a mold 30a, 30b, by deposition of at least one elongated element in concentric coils 27a disposed in mutual side by side relationship according to circumferences of increasingly growing diameter about their geometric winding axis, corresponding to the rotation axis of the tire.

This operation can be advantageously carried out through winding of the elongated element in a helical seating arranged in a first cheek 30a of the mold 30a, 30b which for the purpose can be driven in rotation about its own geometric axis.

Then a second annular insert 28 is located within the molding cavity 30, formation of which can advantageously take place in the same manner as described for the first annular insert 27.

The deposition step of the elongated element or elements intended for formation of one or both annular inserts 27, 28 can be advantageously preceded by a rubberizing step during which the elongated element, preferably of metal material, is coated with at least one layer of raw elastomer material that not only ensures an excellent rubber-metal bond on the elongated element itself, but also promotes adhesion thereof for a steady placement in the above mentioned helical seating.

The first cheek 30a and/or the second cheek 30b may be also advantageously provided to be made of a magnetic material, or to be activated in an electromagnetic manner so as to conveniently attract and retain the respective elongated element, thereby ensuring a steady positioning of coils 27a and/or 28a as and when they are formed.

Then, the filling body 29 is formed within the molding cavity 30 Forming of said body may be conveniently carried out by interposing at least one annular element of raw elastomer material of predetermined volume between the first and second annular inserts 27, 28 formed on the respective cheeks 30a, 30b. This annular element can have any convenient conformation in transverse section, provided its volume corresponds to the inner volume of the molding chamber 30 when cheeks 30a, 30b are moved close to each other in a closed condition of the mold.

Once the annular element has been positioned between cheeks 30a, 30b, closure of the molding cavity 30 by mutual approaching of the cheeks is carried out. Under this circumstance, the volume of the molding cavity 30 is reduced, so that the annular element of raw elastomer material is pressed between the first and second annular inserts 27, 28 being submitted to deformation until it completely fills the molding cavity, thereby forming the filling body 29 which is intimately joined to the first and second annular inserts 27, 28.

As an alternative solution to the above, formation of the filling body 29 can be carried out for example by filling the molding cavity 30 with elastomer material introduced by injection or any other manner convenient for a person skilled in the art, after moving cheeks 30a, 30b close to each other.

The above described accomplishment of the inextensible annular structures 4 can advantageously take place close to the toroidal support 11, so that said structures can be directly removed from mold 30a, 30b and laterally applied to the first carcass ply 3 by appropriate mechanical handling devices not described as not of importance to the aims of the invention.

In accordance with a further preferential feature of the invention, accomplishment of the carcass structure 2 further involves formation of at least one second carcass ply 31.

Advantageously, this second carcass ply 31 can be formed directly upon the first carcass ply 3 and the inextensible annular structures 4, so that, as clearly shown in FIG. 10, the second annular insert 28 of each annular structure 4 is disposed in contact with an inner surface of the second carcass ply.

In accordance with a possible alternative solution, accomplishment of each annular structure 4 may first involve formation of the first annular insert 27 alone joined to the filling body 29, to carry out application of the second annular insert 28 subsequently to formation of the second carcass ply 31. In this case, each of the inner circumferential portions of the second carcass ply 31 is interposed between the respective filling body 29 and the second annular insert 28, which is applied to the cuter surfaces of the second carcass ply itself, in contact relationship therewith.

Preferably the second carcass ply 31 is manufactured in such a manner that it has its respective thread-like elements 32 disposed according to a crossed orientation relative to the thread-like elements 14 belonging to the first carcass ply 3.

In more detail, formation of the second carcass ply 31 conveniently takes place in the same manner as previously described with reference to manufacturing of the first carcass ply 3, i.e. by sequential deposition of respective strip-like lengths 33, to define respective crown portions 34 disposed consecutively in side by side relationship in a circumferential direction and side portions 35 each partly covered by the side portion 35 of the adjacent strip-like length 33. In the accompanying figures, the covering or mutual-superposition regions of the strip-like lengths 33 forming the second carcass ply 31 are denoted by 33a.

Conveniently, the strip-like-lengths 33 of the second carcass ply 31 are laid down according to a crossed orientation relative to the strip-like lengths 13 forming the first carcass ply. In addition, it is preferably provided that inclination of the strip-like lengths 33 of the second carcass ply 31, with reference to the equatorial plane X—X, should substantially have the same value as the inclination of the strip-like lengths 13 belonging to the first carcass ply 3.

In tires of the radial type, a belt structure 5 is currently applied to the carcass structure 2.

This belt structure 5 may be made in any manner convenient for a person skilled in the art and in the embodiment shown it essentially comprises a first and a second belt strips 6a, 6b having cords with a respectively crossed orientation. Superposed on the belt strips is an auxiliary belt strip 7, for instance obtained by winding at least one continuous cord in coils disposed axially side by side on the first and second belt strips 5, 6.

Then the tread band 8 and sidewalls 9, which are also obtained in any manner convenient for a person skilled in the art, are applied to the belt structure 5.

Embodiments of a belt structure, sidewalls and a tread band that can be advantageously put into practice for a complete accomplishment of the tire in reference on the toroidal support 11 are described in the European Patent Application No. 97830632.2 in the name of the same Applicant.

Tire 1 as manufactured and after removal of same from support 11, can be now submitted to a vulcanization step that can be carried out in any known and conventional manner.

According to a possible alternative solution, an air tube of closed tubular section may be advantageously associated with tire 1 in addition to, or in place of liner 10, before the vulcanization step, which air tube is inserted into carcass 2 after the tire has been removed from the toroidal support 11. This air tube, not shown in the accompanying drawings, will be inflated after the tire has been introduced into a vulcanization mold, to supply an inner pressure adapted to ensure a perfect adhesion of the tire against the mold walls and, in particular, against the mold parts intended for defining the longitudinal and transverse cuts 8a of the tread pattern.

According to a further preferential feature of the present invention, during the vulcanization step the carcass plies 3, 31 and belt strips 6a, 6b, 7 are submitted to a stretching step to achieve a pre-tensioning thereof, giving rise to a tire expansion of a linear amount, measured on the circumferential extension at the equatorial plane X-X of the tire itself, included by way of example between 2% and 5%. This stretching step can be achieved by effect of the inflation pressure of the above mentioned air tube, or other type of inflatable chamber or bladder employed in the vulcanization apparatus.

The present invention achieves important advantages.

Actually, the tire in reference can be obtained through manufacture of the different components directly on a toroidal support on which the tire is gradually formed or in any case very close thereto. In this way all problems connected with manufacture, storage and management of semifinished products which are common to manufacturing processes of the traditional type are eliminated.

It is to note in particular that formation of the carcass ply or plies by deposition of strip-like lengths each formed of several cords incorporated into one elastomer layer enables important advantages to be achieved. First of all, in comparison with the method described in the above mentioned U.S. Pat. No. 5,362,343, the manufacturing time for each carcass ply can be greatly reduced, due to the simultaneous deposition of as many thread-like elements as they are contained in each strip-like length 13 or the continuous strip-like element 2a from which lengths 13 come. Employment of the strip-like lengths 13 also dispenses with the need for previously depositing liner 10 onto the toroidal support. Actually, the elastomer layer 17 employed in forming the continuous strip-like element 2a is capable by itself of ensuring an efficient adhesion of element 2a to the toroidal support 11, thereby ensuring a steady positioning of the individual lengths 13, 33.

Positioning accuracy as regards strip-like lengths 13, 33 and thread-like elements integrated thereinto is further improved by the fact that each strip-like length has an important structural consistency that makes it insensitive to vibrations or similar oscillation effects which can be transmitted by the deposition apparatus 19. In this connection it is to note that deposition of individual cords, as described in U.S. Pat. No. 5,362,343, may be somewhat problematic, due exactly to vibrations and/or oscillations undergone by said cords during the deposition step.

Furthermore, simultaneous deposition of a plurality of thread-like elements in accordance with the invention enables the deposition apparatus 19 to be operated at slower rates than required when deposition of individual cords is concerned, which is a further advantage in terms of working accuracy without on the other hand impairing productivity.

Besides, deposition of strip-like lengths directly crownwise to a toroidal support of a profile substantially identical with that of the finished tire enables densities to be achieved that cannot be reached in the art by known methods providing deposition of a carcass ply in the form of a cylindrical sleeve and subsequent shaping of same into a toroidal form, which will consequently bring about thinning of the carcass ply cords disposed crownwise to the finished tire.

In addition to the above, each strip-like length can be steadily fastened to the toroidal support by a vacuum effect produced through possible suction ducts 26, which steady fastening by vacuum cannot be achieved by known processes carrying out deposition of individual cords.

If required, the side portions of the strip-like lengths can be disposed at a suitably increased inclination relative to a direction radial to the toroidal support axis, which will enable the expansion undergone by the tire during the stretching step imposed to it on vulcanization to be efficiently helped. Actually, during this step, the side portions 25, 35 tend to take an orientation in a plane radial to the tire together with the crown portions 24, 34 extending between the side portions.

The construction and structure conception of the tire in question, above all with reference to its carcass structure 2, enables important improvements to be achieved in terms of structural strength, above all close to the sidewalls and beads, where a greater structural strength is usually required, as well as in terms of behavior, above all in connection with the effects of the slip thrusts that occur when tires are run on bends.

Actually it is to note that, even if each carcass ply 3, 31 is taken into account separately from the other carcass ply, the mutual superposition or partial covering of the strip-like lengths 13, 33 gives rise to a first structural strengthening at the tire sidewall regions. This strengthening is also promoted by the fact that, as above described, in the regions of mutual superposition of the strip-like lengths 13, 33, the thread-like elements 14, 32 belonging to the two lengths are disposed in mutually-crossed orientations.

The mutually-crossed orientation of the strip-like lengths 13, 33 forming the first and second carcass plies 3, 31 respectively constitutes a second strengthening factor for carcass structure 2. This second strengthening factor partly results from the mutually-crossed arrangement provided for the thread-like elements 14, 32 belonging to the first and second carcass plies 3, 31 respectively, and partly results from the mutually-crossed arrangement provided for the covering or superposition regions 13a, 33a of lengths 13, 33 belonging to the first and second carcass plies.

Figure 11:
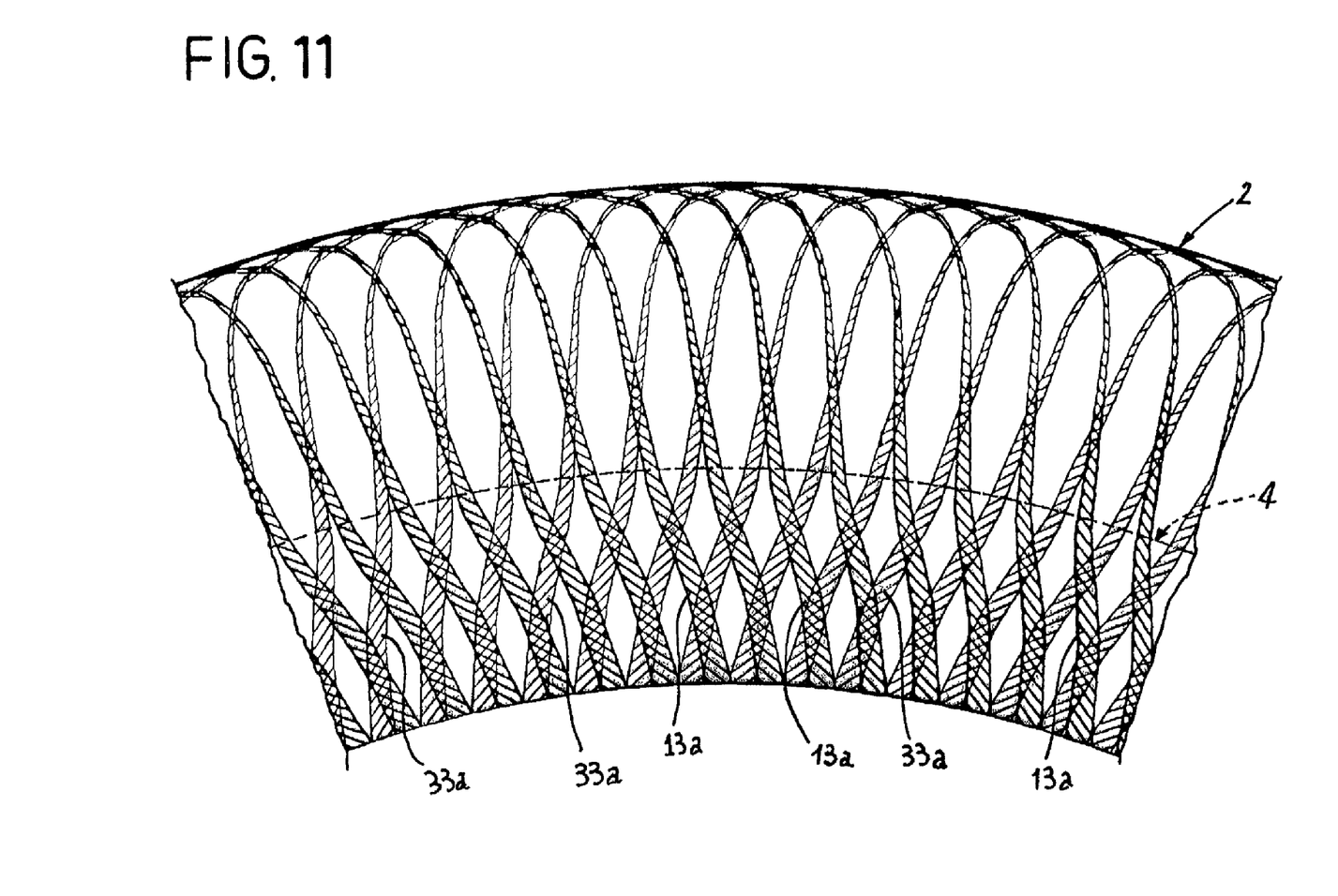
FIG. 11 is a diagram showing the carcass structure of a tire in accordance with the invention, seen laterally and in phantom for highlighting the mutual arrangement of the portions in superposed relationship of the individual strip-like lengths belonging to two different carcass plies.

This crossed arrangement of the superposition regions 13a, 33a is clearly shown in FIG. 11. From said figure one can easily understand that the mutual-superposition regions 13a, 33a belonging to the first and second carcass plies 3, 31 respectively, define a type of network structure giving the tire an exceptional structural strength. In particular, in this manner qualities such as resistance to accidental shocks against pavement borders or the like for example, and tire resistance to torsional stresses about the rotation axis are improved, which will make the tire appropriate to withstand high torque values both during acceleration and braking.

In addition to the above, the construction features of the inextensible annular structures 4 are adapted to further increase the structural strength of the tire at the bead and sidewall regions.

Actually, the presence of the circumferentially inextensible annular inserts 27, 28 intimately joined to the carcass plies 3, 31 creates a further "bond" between the mutually-crossed thread-like elements 14, 32 belonging to the first and second carcass plies 3, 31. Thus, the carcass structure 2 is further strengthened at the regions corresponding to the tire beads without for the purpose requiring employment of additional strip-like inserts, usually called "flippers", wound like a slipknot about the inextensible annular structures 4, said flippers being used on the contrary in the known art.

Figure 12:
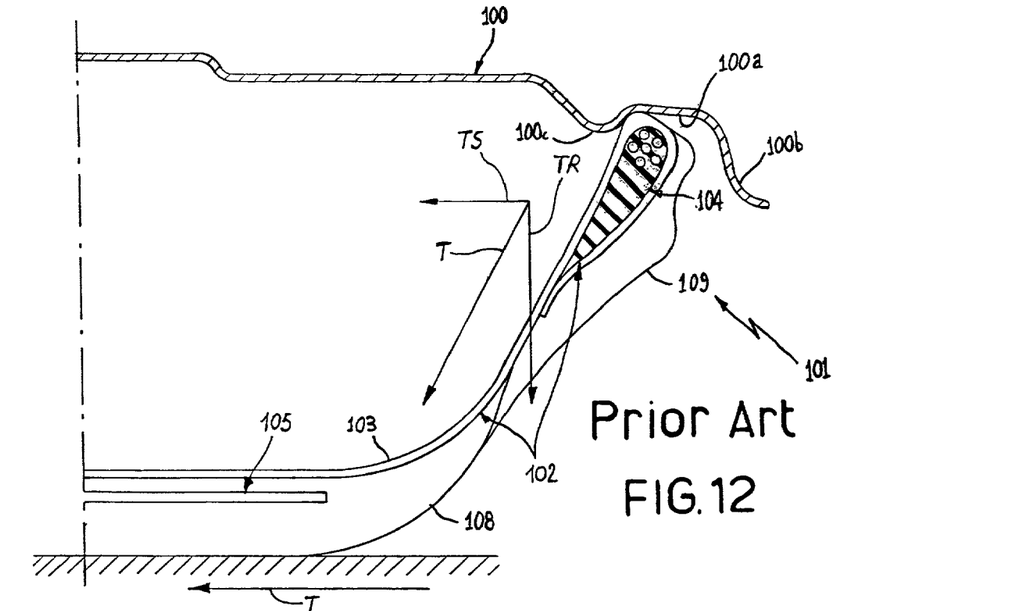
FIG. 12 is a transverse half-section showing a conventional tire mounted on a respective mounting rim and in a condition of slip running and partial deflation.
Figure 13:
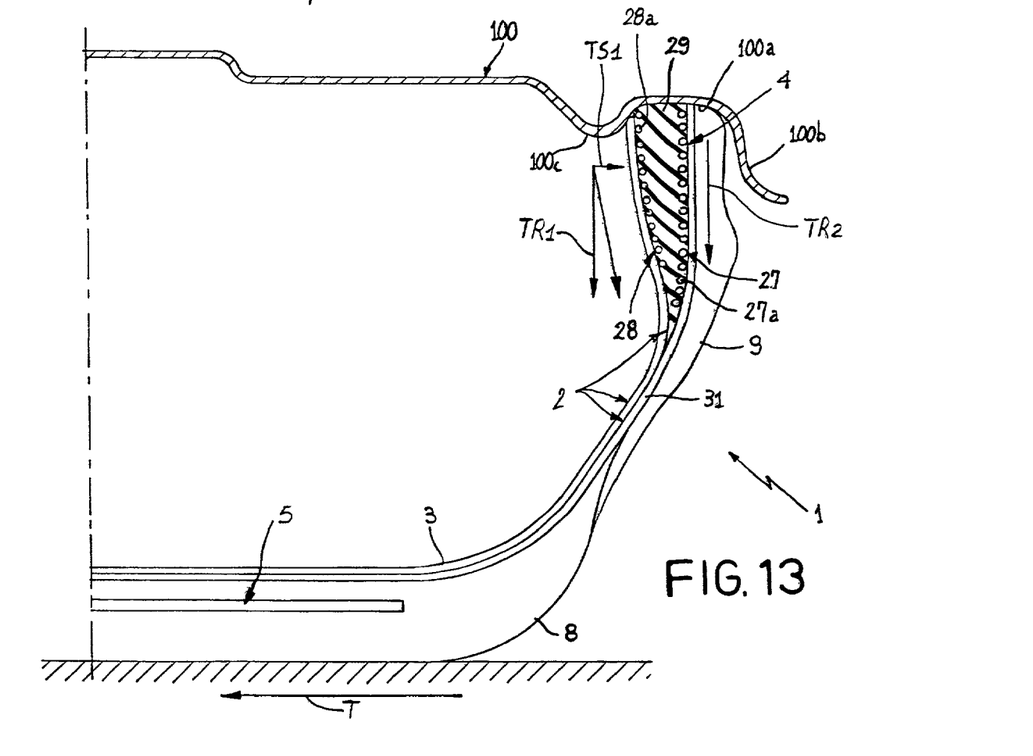
FIG. 13 is a transverse half-section showing a tire according to the invention mounted on a respective mounting rim and in a condition of slip running and partial deflation.

From a comparison between FIGS. 12 and 13 one can easily notice the improvement produced by the construction expedients described above in connection with the tire behavior under the effect of slip thrusts directed axially of the tire, generated when the tire is run on a bend, for example. For the sake of clarity, section hatching has been intentionally omitted from the tires shown in FIGS. 12 and 13. It is also to point out that, for better highlighting the phenomena triggered by the slip thrusts, FIGS. 12 and 13 have been made with reference to tires under conditions of partial deflation.

In more detail, FIG. 12 shows a tire 101 of the traditional type, mounted on a respective rim 100 that, in register with each tire bead, has a bead seat 100a axially delimited by a flange 100b defining an outer side edge of the rim and a security hump 100c. The different components of tire 101 are marked by numeral Indices obtained by adding 100 to the numeral value of the indices previously employed for corresponding parts of tire 1 in accordance with the invention.

In tire 101 made in accordance with the known art, the carcass ply or plies tend to bend at the tire sidewall under the effect of the slip thrust T, generated parallelly to the rotation axis of the tire by friction of the tread band 108 on the ground, on a bend.

This slip thrust T, transmitted along the ply or plies 103 of the carcass structure 102 up to the inextensible annular structures 104, generates a radial component Tr and an axial component Ts. The radial component Tr is counteracted by the circumferential inextensibility of the annular structure 104 resting, over the whole circumferential volume thereof, on the respective seat 100a provided in rim 100. The axial component Ts, oriented towards the equatorial plane of the tire, tends to move the tire bead away from the flange 100b of rim 100 and is usually counteracted by the security hump 100c. The radial sizes of the security hump are however rather limited and it may easily happen that, when the axial component Ts exceeds given values, the tire bead is removed from its respective seat 100a, instantaneously causing a full deflation and a consequent loss of functionality of tire 100. This phenomenon is also facilitated by the fact that the tire bead structured in accordance with the known art, under the effect of the slip thrust T, tends to "roll" on the security hump 100c.

The risks that the above described phenomenon of removal of the bead from its seat may occur are particularly important when the tire is forced to run under conditions of partial deflation, and the carcass structure 102 is therefore subjected to undergo important deformations under the effect of the slip thrusts.

Referring now to the tire in reference shown in FIG. 13, the annular structures 4 of the invention, interposed between the first and second carcass plies 3, 31, prevent the tire beads from rotating, under the effect of the slip thrust T, around their resting point against the respective security humps 100c provided in rim 100.

In more detail, it is to note that the presence of the circumferentially inextensible annular inserts 27, 28 located internally of, and directly in contact with the respective carcass plies 3, 31 and mutually spaced apart by interposition of the filling body 29, efficiently prevents the bead from bending and rotating under the effect of slip thrusts. Actually, on examining FIG. 13 one can see that the slip thrust T would tend to bend the inextensible annular structure 4 towards the equatorial plane of tire 1. Under this circumstance, the first annular insert 27 tends to be radially compressed, whereas the second annular insert 28 is subjected to a tensile stress in a radial direction. However, the circumferential inextensibility of the individual coils 27a, 28a forming inserts 27, 28, as well as the intimate union of said inserts with the respective carcass plies 3, 31 having the respective thread-like elements 14, 32 mutually crossed at the superposition regions 13a, 33a, inhibit the capability of bending deformation of the inextensible annular structure 4 almost completely.

The slip force T is equitably shared between the first and second carcass plies and transmitted along said plies until the respective first and second inextensible annular elements 27, 28 provided in structure 4.

Under this situation the slip force T portion transmitted along the first carcass ply 3 until close to the first annular insert 27 gives rise to a radial component $Tr_1$ tending to move the bead away from the bead seat 55 and counteracted by the circumferential inextensibility of the annular structure 4, as well as to an axial component $Ts_1$ tending to push the bead against the circumferential flange 53, thereby ensuring maintenance of a steady positioning of said bead.

The slip force T portion transmitted along the second carcass ply 31 generates a radial component $Tr_2$ as well, which is counteracted by the circumferential inextensibility of the second annular insert 28, and an axial component tending to push the bead against the flange 100b but which has a practically zero value when, as in the case shown, the inner circumferential edge of the second carcass ply takes an orientation perpendicular to the tire axis.

A correct positioning of the bead is in any case ensured by the above described axial component $Ts_1$.

In this way the tire having beads made in accordance with the present invention can bear the so-called "J-curve Test" without removal of the bead from its seat until inflation pressures of 0.5 bar, whereas in the known art tires that are unable to counteract bead displacements from their seats at pressures lower than 0.8–1.0 bar are considered as acceptable.

It is also to note that the annular inserts 27 and 28 furnish a further structural protection of the tire at the beads.

Increase in the structural strength at the sidewalls has been advantageously obtained without involving an excessive stiffening at the carcass structure crown, where the lengths of each ply are disposed circumferentially side by side in the absence of mutual superposition. This aspect is particularly advantageous with reference to high-performance lowered-profile tires where the structural strength of the sidewalls is greatly critical, also due to the high torque values that the tire must be able to transmit.

What is claimed is:

1. A method of making a tire, the tire comprising a carcass structure and at least one circumferentially inextensible annular structure, comprising:
   forming at least one carcass ply of the carcass structure;
   wherein forming the at least one carcass ply comprises:
      forming at least one first carcass ply; and
      forming at least one second carcass ply superposed on the at least one first carcass ply;
   forming the at least one annular structure; and
   applying the at least one annular structure to a region close to inner circumferential edges of the at least one carcass ply;
   wherein forming each carcass ply comprises:
      preparing strip lengths, each strip length comprising longitudinal and parallel thread elements at least partly coated with at least one layer of raw elastomer material; and
      depositing the strip lengths onto a toroidal support in a substantially U-shaped conformation about a profile in transverse section of the toroidal support;

wherein each strip length comprises:
two side portions that substantially extend in planes orthogonal to a geometric axis of rotation of the toroidal support at mutually-spaced-apart positions in an axial direction;
a crown portion that extends at a radially outer position in a plane substantially parallel to the geometric axis of rotation of the toroidal support; and
two mutually-axially-spaced-apart transition regions that are defined between the side portions and the crown portion, respectively;
wherein the thread elements of the at least one second carcass ply are disposed according to a crossed orientation relative to the thread elements of the at least one first carcass ply;
wherein the crown portions of the strip lengths are disposed consecutively in side-by-side relationship along a circumferential extension of the toroidal support,
wherein edges of circumferentially consecutive strip lengths abut uniformly along their entire crown portions extending between the transition regions,
wherein each side portion of the strip lengths covers in part or is partly covered by a side portion of at least one circumferentially consecutive strip length,
wherein forming the at least one annular structure comprises depositing at least one first elongated element in substantially concentric coils to form a first circumferentially inextensible annular insert, substantially in a form of an annulus, and
wherein the respective side portions of the strip lengths are not turned up around the first annular insert.

2. The method of claim 1, wherein the strip lengths am prepared by cutting actions executed sequentially on at least one continuous strip element incorporating the thread elements in the at least one layer of raw elastomer material.

3. The method of claim 2, wherein each cutting action is followed by deposition of an individual strip length thus obtained onto the toroidal support.

4. The method of claim 1, wherein the side portions of circumferentially consecutive skip lengths on the toroidal support converge toward the geometric axis of rotation of the toroidal support.

5. The method of claim 1, wherein an amount of coverage of the side portions of the strip lengths progressively decreases, starting from a maximum value at radially inner ends of the side portions until a zero value at the transition regions.

6. The method of claim 1, wherein the strip lengths are sequentially deposited onto the toroidal support according to a circumferential distribution pitch corresponding to a width of the strip lengths.

7. The method of claim 1, wherein the strip lengths are sequentially deposited onto the toroidal support according to a circumferential distribution pitch corresponding to a multiple of a width of the strip lengths.

8. The method of claim 1, wherein the strip lengths have a width corresponding to a submultiple of a circumferential extension of the toroidal support, as measured at an equatorial plane of the toroidal support.

9. The method of claim 1, further comprising:
sequentially pressing the side portions of each strip length to define regions of increased width close to inner circumferential edges of the carcass structure.

10. The method of claim 9, wherein the strip lengths are prepared by cutting actions executed sequentially on at least one continuous strip element incorporating the thread elements in the at least one layer of raw elastomer material, and wherein sequentially pressing the side portions is carried out on the at least one continuous strip element before execution of corresponding cutting actions.

11. The method of claim 9, further comprising:
moving the thread elements in the strip lengths apart from each other concurrently with sequentially pressing the side portions.

12. The method of claim 1, wherein during depositing the strip lengths, at least one of the strip lengths is held on the toroidal support by a suction action produced through the toroidal support.

13. The method of claim 1, wherein depositing the strip lengths comprises:
laying down each strip length transversely and at a centered position relative to an equatorial plane of the toroidal support;
radially moving each strip length close to the toroidal support so as to form the crown portions of the strip lengths on the toroidal support;
translating opposite ends of each strip length substantially radially close to the geometric axis of rotation of the toroidal support for applying the side portions of the strip lengths to the toroidal support; and
rotating the toroidal support through an angular pitch corresponding to a circumferential distribution pitch of the strip lengths.

14. The method of claim 1, further comprising:
pressing the side portions of the strip lengths against side walls of the toroidal support.

15. The method of claim 1, further comprising:
coating the toroidal support with at least one sealing layer or liner made of an elastomer material impervious to air prior to forming the at least one carcass ply.

16. The method of claim 15, wherein coating the toroidal support is carried out by winding at least one ribbon band of an air-proof elastomer material in coils disposed side-by-side along the profile in transverse section of the toroidal support.

17. The method of claim 1, further comprising:
disengaging the tire from the toroidal support;
introducing an air tube into the carcass structure; and
vulcanizing the tire.

18. The method of claim 1, further comprising:
vulcanizing the tire; and
stretching the carcass structure during vulcanizing to achieve an expansion of the tire of a linear amount between 2% and 5%.

19. The method of claim 1, further comprising:
depositing at least one second elongated element in substantially concentric coils to form a second circumferentially inextensible annular insert substantially in a form of an annulus disposed concentrically in a side-by-side relationship relative to the first annular insert; and
forming at least one filling body of raw elastomer material interposed between the at least one first elongated element and the at least one second elongated element.

20. The method of claim 19, wherein the at least one first elongated element and the at least one second elongated element are deposited into a molding cavity, and
wherein the at least one filling body is formed in the molding cavity.

21. The method of claim 20, wherein the at least one filling body is formed in the molding cavity by:
interposing at least one annular element of raw elastomer material of predetermined volume between the first and second annular inserts; and reducing a volume of the molding cavity to compress and deform the at least one annular element until the at least one annular element, the at least one first elongated element, and the at least one second elongated element fill the molding cavity.

22. The method of claim 20, wherein the at least one filling body is formed in the molding cavity by injecting raw elastomer material between the first and second annular inserts.

23. The method of claim 20, further comprising:
magnetically retaining at least one of the first and second annular inserts at a predetermined position within the molding cavity.

24. The method of claim 19, wherein at least one of the substantially concentric coils of the first annular insert, the second annular insert, or the first and second annular inserts is defined by a continuous spiral of one or more elongated elements.

25. The method of claim 19, wherein at least one of the substantially concentric coils of the first annular insert, the second annular insert, or the first and second annular inserts is defined by concentric rings of one or more elongated elements.

26. The method of claim 19, wherein each annular structure is interposed between at least one first carcass ply and a second carcass ply superposed on the at least one first carcass ply.

27. The method of claim 19, further comprising:
coating one or more of the at least one first and second elongated elements with at least one layer of raw elastomer material;
wherein each coated elongated element is coated prior to depositing the coated elongated element.

28. A method of making a tire, the tire comprising a carcass structure and at least one circumferentially inextensible annular structure, comprising:
forming at least one carcass ply of the carcass structure;
wherein forming the at least one carcass ply comprises:
forming at least one first carcass ply: and
forming at least one second carcass ply superposed on the at least one first carcass ply;
forming the at least one annular structure; and
applying the at least one annular structure to a region close to inner circumferential edges of the at least one carcass ply;
wherein forming each carcass ply comprises:
preparing strip lengths, each strip length comprising longitudinal and parallel thread elements at least partly coated with at least one layer of raw elastomer material; and
depositing the strip lengths onto a toroidal support in a substantially U-shaped conformation about a profile in transverse section of the toroidal support;
wherein each strip length comprises:
two side portions that substantially extend in planes orthogonal to a geometric axis of rotation of the toroidal support at mutually-spaced-apart positions in an axial direction;
a crown portion that extends at a radially outer position in a plane substantially parallel to the geometric axis of rotation of the toroidal support; and
two mutually-axially-spaced-apart transition regions that are defined between the side portions and the crown portion, respectively;

wherein the thread elements of the at least one second carcass ply are disposed according to a crossed orientation relative to the thread elements of the at least one first carcass ply;
wherein the crown portions of the strip lengths are disposed consecutively in side-by-side relationship along a circumferential extension of the toroidal support,
wherein edges of circumferentially consecutive strip lengths abut uniformly along their entire crown portions extending between the transition regions,
wherein each side portion of the strip lengths covers in part or is partly covered by a side portion of at least one circumferentially consecutive strip length,
wherein forming the at least one annular structure comprises depositing at least one first elongated element in substantially concentric coils to form a first circumferentially inextensible annular insert, substantially in a form of an annulus,
wherein the side portions of the strip lengths are not turned up around the first annular insert, and
wherein the carcass structure does not comprise flippers wound about the at least one annular structure.

29. The method of claim 28, wherein the strip lengths are prepared by cutting actions executed sequentially on at least one continuous strip element incorporating the thread elements in the at least one layer of raw elastomer material.

30. The method of claim 29, wherein each cutting action is followed by deposition of an individual strip length thus obtained onto the toroidal support.

31. The method of claim 28, wherein the side portions of circumferentially consecutive strip lengths on the toroidal support converge toward the geometric axis of rotation of the toroidal support.

32. The method of claim 28, wherein an amount of coverage of the side portions of the strip lengths progressively decreases, starting from a maximum value at radially inner ends of the side portions until a zero value at the transition regions.

33. The method of claim 28, wherein the strip lengths are sequentially deposited onto the toroidal support according to a circumferential distribution pitch corresponding to a width of the strip lengths.

34. The method of claim 28, wherein the strip lengths are sequentially deposited onto the toroidal support according to a circumferential distribution pitch corresponding to a multiple of a width of the strip lengths.

35. The method of claim 28, wherein the strip lengths have a width corresponding to a submultiple of a circumferential extension of the toroidal support, as measured at an equatorial plane of the toroidal support.

36. The method of claim 28, further comprising:
sequentially pressing the side portions of each strip length to define regions of increased width close to inner circumferential edges of the carcass structure.

37. The method of claim 36, wherein the strip lengths are prepared by cutting actions executed sequentially on at least one continuous strip element incorporating the thread elements in the at least one layer of raw elastomer material, and
wherein sequentially pressing the side portions is carried out on the at least one continuous strip element before execution of corresponding cutting actions.

38. The method of claim 36, further comprising:
moving the thread elements in the strip lengths apart from each other concurrently with sequentially pressing the side portions.

39. The method of claim 28, wherein during depositing the strip lengths, at least one of the strip lengths is held on the toroidal support by a suction action produced through the toroidal support.

40. The method of claim 28, wherein depositing the strip lengths comprises:
laying down each strip length transversely and at a centered position relative to an equatorial plane of the toroidal support;
radially moving each strip length close to the toroidal support to form the crown portions of the strip lengths on the toroidal support;
translating opposite ends of each strip length substantially radially close to the geometric axis of rotation of the toroidal support for applying the side portions of the strip lengths to the toroidal support; and
rotating the toroidal support through an angular pitch corresponding to a circumferential distribution pitch of the strip lengths.

41. The method of claim 28, further comprising:
pressing the side portions of the strip lengths against side walls of the toroidal support.

42. The method of claim 28, further comprising:
coating the toroidal support with at least one sealing layer or liner made of an elastomer material impervious to air prior to forming the at least one carcass ply.

43. The method of claim 42, wherein coating the toroidal support is carried out by winding at least one ribbon band of an air-proof elastomer material in coils disposed side-by-side along the profile in transverse section of the toroidal support.

44. The method of claim 28, further comprising:
disengaging the tire from the toroidal support;
introducing an air tube into the carcass structure; and
vulcanizing the tire.

45. The method of claim 28, further comprising:
vulcanizing the tire; and
stretching the carcass structure during vulcanizing to achieve an expansion of the tire of a linear amount between 2% and 5%.

46. The method of claim 28, further comprising:
depositing at least one second elongated element in substantially concentric coils to form a second circumferentially inextensible annular insert substantially in a form of an annulus disposed concentrically in a side-by-side relationship relative to the first annular insert; and
forming at least one filling body of raw elastomer material interposed between the at least one first elongated element and the at least one second elongated element.

47. The method of claim 46, wherein the at least one first elongated element and the at least one second elongated element are deposited into a molding cavity, and
wherein the at least one filling body is formed in the molding cavity.

48. The method of claim 47, wherein the at least one filling body is formed in the molding cavity by:
interposing at least one annular element of raw elastomer material of predetermined volume between the first and second annular inserts; and
reducing a volume of the molding cavity to compress and deform the at least one annular element until the at least one annular element, the at least one first elongated element, and the at least one second elongated element fill the molding cavity.

49. The method of claim 47, wherein the at least one filling body is formed in the molding cavity by injecting raw elastomer material between the first and second annular inserts.

50. The method of claim 47, further comprising:
magnetically retaining at least one of the first and second annular inserts at a predetermined position within the molding cavity.

51. The method of claim 46, wherein at least one of the substantially concentric coils of the first annular insert, the second annular insert, or the first and second annular inserts is defined by a continuous spiral of one or more elongated elements.

52. The method of claim 46, wherein at least one of the substantially concentric coils of the first annular insert, the second annular insert, or the first and second annular inserts is defined by concentric rings of one or more elongated elements.

53. The method of claim 46, wherein each annular structure is interposed between at least one first carcass ply and a second carcass ply superposed on the at least one first carcass ply.

54. The method of claim 46, further comprising:
coating one or more of the at least one first and second elongated elements with at least one layer of raw elastomer material;
wherein each coated elongated element is coated prior to depositing the coated elongated element.

* * * * *